United States Patent
Sharif et al.

(10) Patent No.: US 11,928,466 B2
(45) Date of Patent: Mar. 12, 2024

(54) DISTRIBUTED REPRESENTATIONS OF COMPUTING PROCESSES AND EVENTS

(71) Applicant: VMware LLC, Palo Alto, CA (US)

(72) Inventors: Mahmood Sharif, Tel Aviv (IL); Vijay Ganti, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 232 days.

(21) Appl. No.: 17/375,702

(22) Filed: Jul. 14, 2021

(65) Prior Publication Data

US 2023/0013574 A1    Jan. 19, 2023

(51) Int. Cl.
| | |
|---|---|
| G06F 9/30 | (2018.01) |
| G06F 9/54 | (2006.01) |
| G06F 18/214 | (2023.01) |
| G06N 3/08 | (2023.01) |

(52) U.S. Cl.
CPC .......... *G06F 9/30036* (2013.01); *G06F 9/542* (2013.01); *G06F 18/214* (2023.01); *G06N 3/08* (2013.01)

(58) Field of Classification Search
CPC .... G06F 9/30036; G06F 9/542; G06F 18/214; G06N 3/08; G06N 3/045; G06N 3/084; G06N 3/0895
See application file for complete search history.

(56) References Cited

U.S. PATENT DOCUMENTS

| | | | |
|---|---|---|---|
| 9,984,682 B1* | 5/2018 | Tao | G10L 15/183 |
| 10,496,924 B1 | 12/2019 | Highnam et al. | |
| 2013/0290380 A1* | 10/2013 | Flickner | H04N 21/44231 |
| | | | 707/803 |
| 2014/0249799 A1* | 9/2014 | Yih | G06F 40/30 |
| | | | 704/9 |
| 2018/0189339 A1* | 7/2018 | Ananthakrishnan | G06F 11/3006 |
| 2019/0163552 A1* | 5/2019 | Xu | G06F 11/0751 |
| 2019/0188295 A1 | 6/2019 | Sirotkovic et al. | |

(Continued)

FOREIGN PATENT DOCUMENTS

WO    2020143320    7/2020

OTHER PUBLICATIONS

S. Ding, H. Benjamin, C. Fung, P. Charland. "Asm2Vec: Boosting static representation robustness for binary clone search against code obfuscation and compiler optimization." IEEE S&P. 2019.

(Continued)

*Primary Examiner* — Farley Abad
(74) *Attorney, Agent, or Firm* — Quarles & Brady LLP

(57) ABSTRACT

Techniques for generating distributed representations of computing processes and events are provided. According to one set of embodiments, a computer system can receive occurrence data pertaining to a plurality of computing processes and a plurality of events associated with the plurality of computing processes. The computer system can then generate, based on the occurrence data, (1) a set of distributed process representations that includes, for each computing process, a representation that encodes a sequence of events associated with the computing process in the occurrence data, and (2) a set of distributed event representations that includes, for each event, a representation that encodes one or more event properties associated with the event and one or more events that occur within a window of the event in the occurrence data.

18 Claims, 3 Drawing Sheets

(56) References Cited

U.S. PATENT DOCUMENTS

| | | | |
|---|---|---|---|
| 2019/0213099 A1* | 7/2019 | Schmidt | G06N 3/044 |
| 2019/0265955 A1 | 8/2019 | Wolf | |
| 2019/0303774 A1 | 10/2019 | Shah et al. | |
| 2020/0027000 A1 | 1/2020 | Pai et al. | |
| 2020/0065616 A1 | 2/2020 | Xu et al. | |
| 2020/0159534 A1 | 5/2020 | Li et al. | |
| 2020/0242506 A1 | 7/2020 | Kelly et al. | |
| 2020/0314117 A1* | 10/2020 | Nguyen | H04L 63/145 |
| 2020/0327225 A1* | 10/2020 | Nguyen | G06N 3/044 |
| 2020/0363920 A1* | 11/2020 | Ignatyev | G06F 9/451 |
| 2021/0027121 A1 | 1/2021 | Zan et al. | |
| 2021/0400071 A1* | 12/2021 | Ray | G06Q 10/067 |

OTHER PUBLICATIONS

U. Alon, M. Zilberstein, O. Levy, E. Yahav. "Code2Vec: Learning distributed representations of code." POPL, 2019.

S. Yun, E. Mariconti, P. A. Vervier, G. Stringhini. "Tiresias: Predicting security events through deep learning." CCS. 2018.

Y. Shen, G. Stringhini. "Attack2Vec: Leveraging temporal word embeddings to understand the evolution of cyberattacks." USENIX Security. 2019.

Chaozhuo Li et al., "Multi-Hot Compact Network Embedding", arXiv:1903.03213v2 [cs.SI], Oct. 21, 2019.

Maico Cassel et al., "Evaluating One-Hot Encoding Finite State Machines for SEU Reliability in SRAM-based FPGAs", Proceedings of the 12th IEEE International On-Line Testing Symposium (IOLTS'06) 0-7695-2620, Sep. 2006, 16 pages.

\* cited by examiner

DISTRIBUTED REPRESENTATIONS OF COMPUTING PROCESSES AND EVENTS

BACKGROUND

Unless otherwise indicated, the subject matter described in this section is not prior art to the claims of the present application and is not admitted as being prior art by inclusion in this section.

Machine learning (ML) algorithms are commonly used to address problems/tasks in the computer security and information technology (IT) infrastructure domains, such as detecting malicious programs and their families, predicting device compromise, performing infrastructure health monitoring, and so on. However, existing approaches for applying ML to these problems/tasks suffer from a number of shortcomings. For example, domain experts are typically needed to manually identify the features (i.e., data attributes/dimensions) that are best suited for solving each problem/task. Further, these approaches generally rely on a large amount of labeled training data in order to effectively train their ML models, which can be difficult—or in some cases infeasible—to acquire. Yet further, ML models used to address different problems/tasks are typically trained from scratch instead of building upon other existing ML models, resulting in long training times, potentially reduced performance, and increased training data demands per model.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques for learning distributed representations of computing processes and events. A computing process (or "process" for short) is an instance of a computer program executed by a computer system. An event is an action or occurrence that takes place during the lifetime of a process, such as a file or network access, an invocation of an application programming interface (API), a creation of another process, and so on. And a distributed representation of a process or event is a vector-based representation of that process/event (also known as an embedding) comprising a set of numerical values corresponding to features in a low-dimensional feature space, where (1) the distributed representations of contextually similar processes/events are located relatively close to one another in the feature space, and (2) the distributed representations of contextually dissimilar processes/events are located relatively far apart in the feature space.

At a high level, the techniques of the present disclosure employ self-supervised learning—an ML training paradigm that extracts training labels from unlabeled training data rather than relying on explicitly provided labels—to generate, via a neural network, distributed representations of processes and their events from process/event occurrence data (e.g., server logs, telemetry data, etc.). The distributed representation generated for each event encodes context information indicating its associated process and neighboring events (i.e., events that occurred within a window around the event). The distributed representation generated for each process encodes context information indicating the sequence of events associated with (or in other words, that occurred during the lifetime of) the process, thereby capturing its runtime behavior.

Once created, the distributed representations can be leveraged by downstream ML algorithms to train ML models that ingest processes and/or events, such as ML models that solve computer security, IT infrastructure management, and other related problems/tasks. Significantly, because these distributed representations are contextually rich and generalizable, they eliminate the need for manual feature engineering, enable effective model training using limited amounts of labeled training data, and facilitate information transfer across ML models. The foregoing and other aspects are described in further detail in the sections below.

2. Operating Environment

Figure 1:
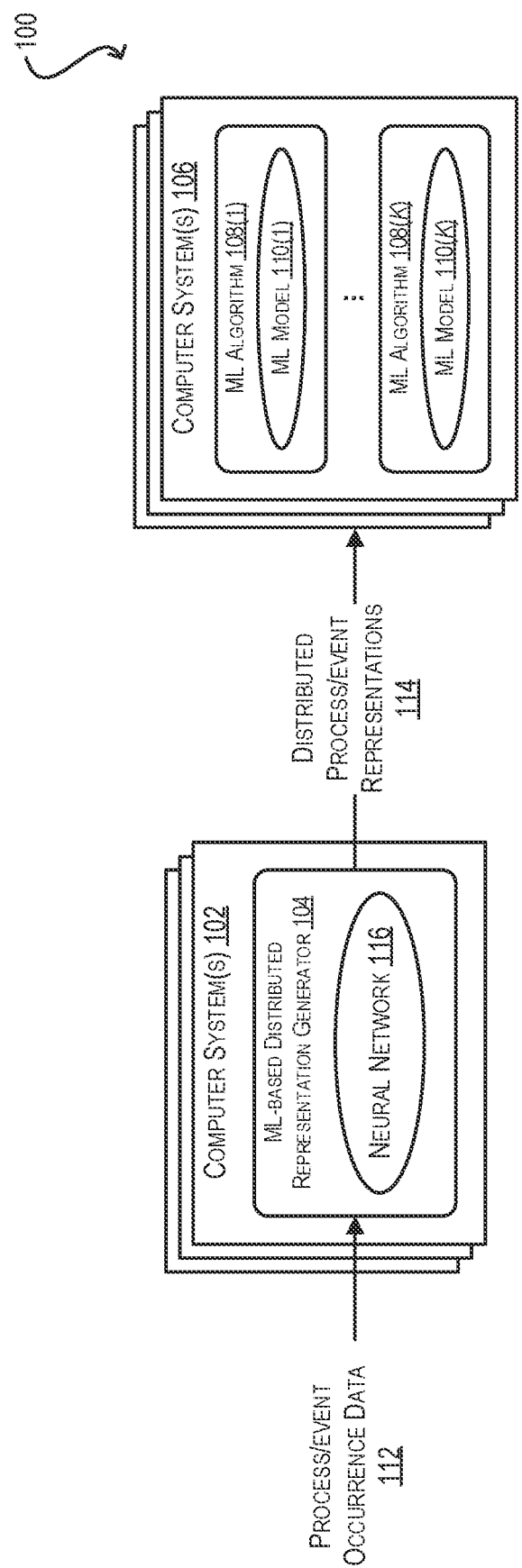
FIG. 1 depicts an example operating environment according to certain embodiments.

FIG. 1 is a simplified block diagram of an example operating environment 100 that implements the techniques of the present disclosure. As shown, operating environment 100 includes one or more computer systems 102 running a novel ML-based distributed representation generator (hereinafter referred to as simply "generator") 104, as well as one or more computer systems 106 running a set of downstream ML algorithms 108(1)-(K). Each downstream ML algorithm 108 is configured to train an ML model 110 that operates on processes and/or events in order to solve a problem or carry out a task. For example, ML model 110(1) of downstream ML algorithm 108(1) may be trained to ingest a representation of a process and predict whether that process is malware. As another example, ML model 110(2) of downstream ML algorithm 108(2) may be trained to ingest representations of one or more events and predict whether an occurrence of the events is indicative of a device compromise.

As noted in the Background section, existing approaches for training these types of ML models are problematic for several reasons: (1) they require manual feature engineering for each ML model, (2) they rely on large amounts of labeled training data to achieve reasonably accurate results, and (3) they cannot easily transfer information from one ML model to another.

Generator 104 of FIG. 1 addresses these problems by (a) receiving process/event occurrence data 112 (e.g., data indicating process $p_1$ executed event sequence $e_1$, $e_2$, $e_3$, process $p_2$ executed event sequence $e_2$, $e_4$, $e_5$, etc.), (b) learning distributed representations 114 of the processes and events from occurrence data 112, where the distributed representation of each process encodes the sequence of events associated with that process, and where the distributed representation of each event encodes the associated process and neighboring events for that event, and (c) providing distributed representations 114 to downstream ML algorithms 108(1)-(K). Process/event occurrence data 112 can be taken from server logs, telemetry data, and/or other data sources that are typically collected in IT environments.

Downstream ML algorithms 108(1)-(K) can then train their respective ML models 110(1)-(K) using distributed process/event representations 114 (rather than using model-specific representations), resulting in a number of benefits.

First, because the features of distributed representations 114 are determined automatically by generator 104 and are generalizable (i.e., not tied to a specific problem/task), there is no need for a domain expert or other individual to manually develop/identify features for each ML model 110.

Second, because distributed representations 114 are contextually rich (i.e., they capture context information for each process and event, such that contextually similar processes have similar process representations and contextually similar events have similar event representations), they allow ML models 110(1)-(K) to be effectively trained with relatively little labeled training data. For example, consider an ML model that is trained to predict whether a process is malware or not. In this case, for various reasons, there may not be a large corpus of training data that identifies malicious and non-malicious processes. However, because each distributed process representation 114 captures the runtime behavior of its corresponding process (via the events that it executes/incurs), the ML model can correctly predict whether a wide variety of processes are malware or not by virtue of their feature similarities or dissimilarities to the relatively small number of training samples used to train the model.

Third, by using the same distributed representations 114 across a multitude of ML models 110(1)-(K), it is significantly easier for one ML model to build upon the trained state of another ML model. This results in accelerated training times, improved model performance, and a further reduction in the amount of labeled data needed for training.

In certain embodiments, generator 104 can implement its functionality via a self-supervised learning approach that involves pre-processing occurrence data 112 to construct a vocabulary of events and corresponding processes and training a neural network 116 to predict the occurrence of an event given the context surrounding it (e.g., its associated process and neighboring events). This training results in the learning of parameter values for one or more hidden layers of neural network 116. Generator 104 can then formulate and output distributed representations 114 in accordance with the learned parameter values. A particular implementation of this self-supervised learning approach is detailed in section (3) below.

It should be appreciated that FIG. 1 is illustrative and not intended to limit embodiments of the present disclosure. For example, although downstream ML algorithms 108(1)-(K) are depicted as being separate from generator 104, in some embodiments the functionality of generator 104 may be incorporated into one or more of these algorithms or vice versa. Further, the various components shown in FIG. 1 may include sub-components and/or implement functions that are not specifically described. One of ordinary skill in the art will recognize other variations, modifications, and alternatives.

3. Neural Network Training Workflow

Figure 2:
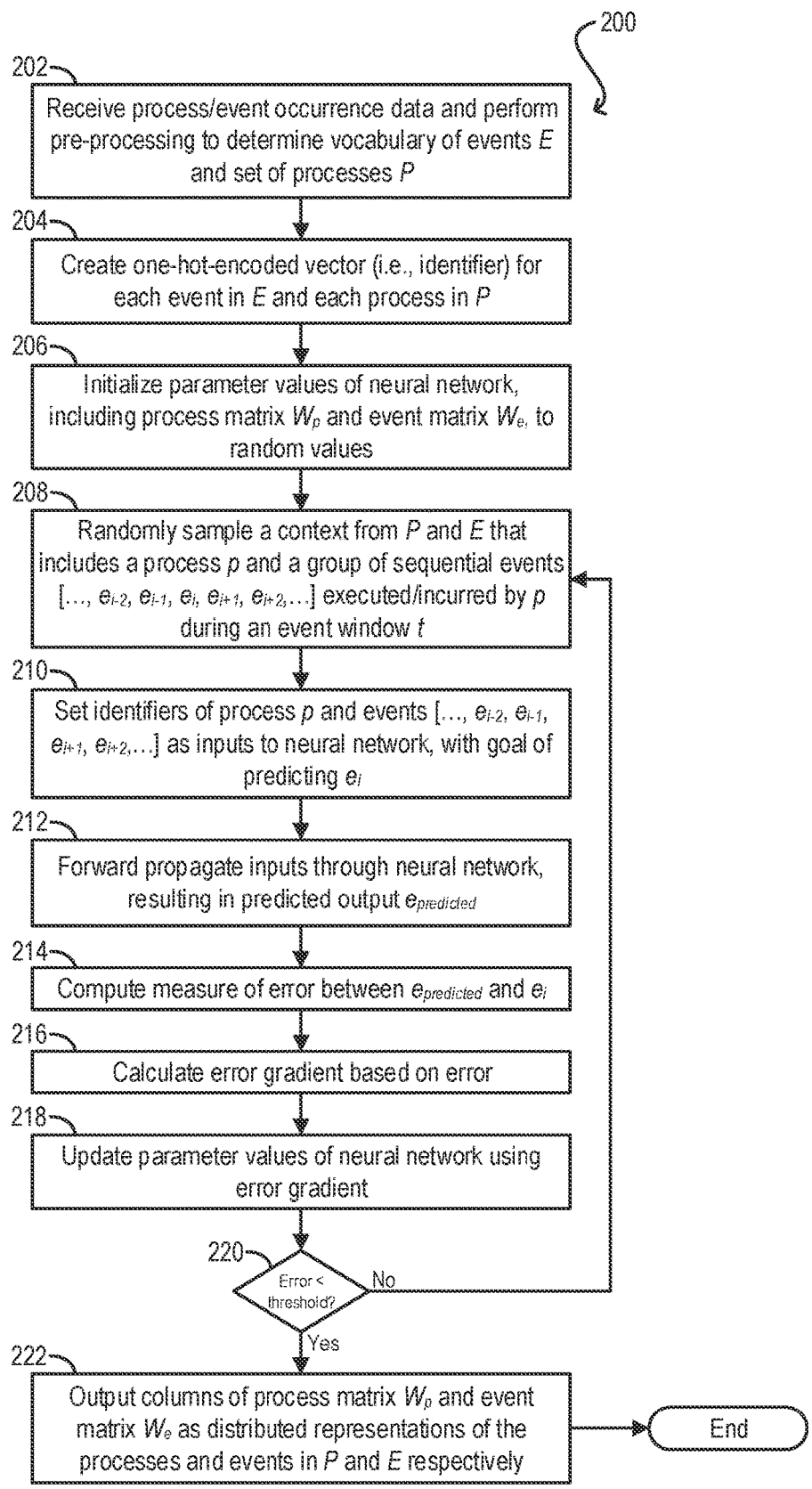
FIG. 2 depicts a neural network training workflow according to certain embodiments.
Figure 3:
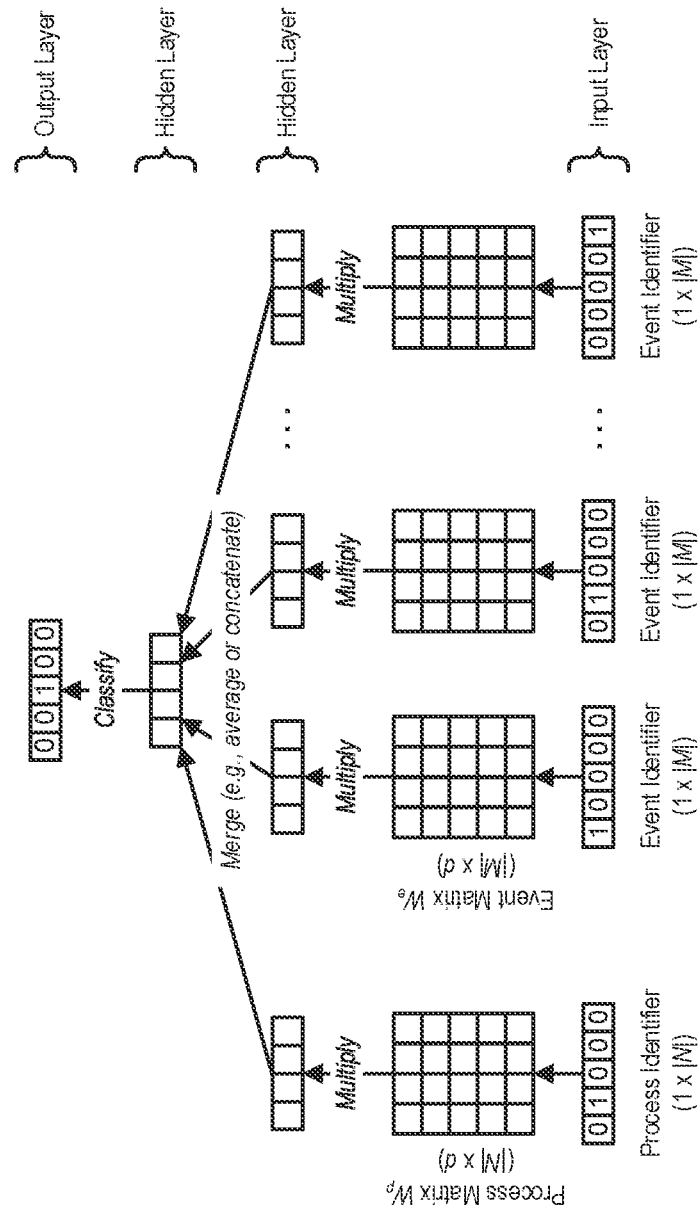
FIG. 3 depicts an example neural network according to certain embodiments.

FIG. 2 depicts a workflow 200 that may be executed by generator 104 of FIG. 1 for training neural network 116 and generating distributed process/event representations 114 according to certain embodiments. Workflow 200 assumes that neural network 116 comprises, among other things, (1) an input layer that takes as input one-hot-encoded vector representations (referred to herein as "identifiers") of a process and a sequence of events associated with that process, (2) a first hidden layer corresponding to the results of multiplying the process identifier with a process matrix $W_p$ and multiplying the event identifiers with an event matrix $W_e$, (3) a second hidden layer corresponding to the result of aggregating (e.g., averaging or concatenating) the components of the first hidden layer, and (4) an output layer that outputs an event predicted by neural network 116 based on the input process and the input events (as determined via a classifier which operates on the output of the second hidden layer) A diagram of neural network 116 in accordance with this structure is shown in FIG. 3.

As described in further detail below, the training of neural network 116 proceeds over a series of iterations, where each iteration involves (a) randomly sampling a "context" comprising a process p (from a set of processes P) and a window of sequential events [ . . . , $e_{i-2}$, $e_{i-1}$, $e_i$, $e_{i+1}$, $e_{i+2}$, . . . ] executed/incurred by p (from a vocabulary of events E), (b) providing identifiers of process p and events [ . . . , $e_{i-2}$, $e_{i-1}$, $e_{i+1}$, $e_{i+2}$, . . . ] as input to neural network 116 and executing a forward pass through the network, resulting in a predicted event $e_{predicted}$, (c) computing an error between $e_{predicted}$ and event $e_i$ (which is the desired target output), (d) calculating, via backpropagation, an error gradient for neural network 116 based on the computed error, and (e) updating the parameters of neural network 116, including process matrix $W_p$ and event matrix $W_e$, using stochastic gradient descent (or any other similar method) to minimize the error. Once the error has fallen below a threshold or a maximum number of iterations is reached, the training is terminated and matrices $W_p$ and $W_e$ will contain distributed representations of the processes in P and the events in E respectively. Generator 104 can thereafter output these distributed representations to, e.g., downstream ML algorithms 108(1)-(K) for use in training their ML models 110(1)-(K).

Turning now to workflow 200, starting at block 202, generator 104 can receive process/event occurrence data 112 and perform a pre-processing pass on this data in order to determine the set (or "vocabulary") of events E and the set of processes P that will be used to train neural network 116. As mentioned previously, process/event occurrence data 112 includes information specifying processes that have been run in some environment and, for each process, an ordered sequence of events executed/incurred during its lifetime. For example, process/event occurrence data 112 can include information indicating that a first process invoked an API A1, issued a write to a file F1, and opened a network connection to a host H1, a second process invoked an API A2, accessed a registry entry R1, and issued a write to a file F2, and so on.

As part of the pre-processing task to determine the set of events E, generator 104 can identify all of the unique events found in process/event occurrence data 112 (e.g., access to API A1, access to API A2, creation of process P1, creation of process P2, network connection to host H1, network connection to host H2, etc.) and, for each identified event, count the number of times that event appears in occurrence data 112. Generator 104 can then add the events whose counts exceed a threshold $T_e$ (and thus appear relatively frequently in occurrence data 112) to E.

Further, as part the pre-processing task to determine the set of processes P, generator 104 can identify all of the unique processes found in process/event occurrence data 112 (e.g., chrome.exe, outlook.exe, etc.) and, for each identified process, count the number of events in E that are associated with that process in occurrence data 112. Generator 104 can then add the processes whose event counts exceed a threshold $T_p$ (and thus have a relatively large amount of event information in occurrence data 112) to P.

Upon determining the set of events E and the set of processes P, generator 104 can create one-hot-encoded binary vectors (i.e., "identifiers") for the events in E and the processes in P (block 204). For example, assuming a total of M events in E, generator 104 can create, for each event in E, a 1×|M| binary vector that includes the value of 1 at a bit position unique to that event and the value of 0 at all other bit positions. Similarly, assuming a total of N processes in P, generator 104 can create, for each process in P, a 1×|N| binary vector that includes the value of 1 at a bit position unique to that process and the value of 0 at all other bit positions.

Generator 104 can then initialize the parameter values of neural network 116, including process matrix $W_p$ and event matrix $W_e$, with random values (or some other starting values) (block 206) and randomly sample, from P and E, a context including a particular process p and a group of sequential events [ ..., $e_{i-2}$, $e_{i-1}$, $e_i$, $e_{i+1}$, $e_{i+2}$, ... ] that were executed/incurred by p within an event window of length t (block 208). For example, if t is set to 7, the context would comprise the events [$e_{i-3}$, $e_{i-2}$, $e_{i-1}$, $e_i$, $e_{i+1}$, $e_{i+2}$, $e_{i+3}$], where i is a randomly selected event number within the overall sequence of events associated with p.

At block 210, generator 104 can set the identifiers of process p and events [ ..., $e_{i-2}$, $e_{i-1}$, $e_{i+1}$, $e_{i+2}$, ... ] (i.e., the events in the context, minus middle event $e_i$) as inputs to neural network 116, with the goal of predicting $e_i$ from these inputs. Note that due to the one-hot-encoded nature of the process and event identifiers, process p maps to a particular column in process matrix $W_p$ (i.e., the column corresponding to the bit position in the process identifier containing the value of 1) and each event e in [ ..., $e_{i-2}$, $e_{i-1}$, $e_{i+1}$, $e_{i+2}$, ... ] maps to a particular column in event matrix $W_e$ (i.e., the column corresponding to the bit position in the event identifier containing the value of 1). These columns represent the distributed representations of process p and events [ ..., $e_{i-2}$, $e_{i-1}$, $e_{i+1}$, $e_{i+2}$, ... ] respectively that will be learned via the training process. The size of process matrix $W_p$ is |N|×d and the size of event matrix $W_e$ is |M|×d, where d is a configurable hyperparameter indicating the number of features/dimensions that will be included in the distributed representations.

Upon setting the randomly sampled context as inputs to neural network 116, generator 104 can forward propagate the inputs through the network, resulting in a predicted event $e_{predicted}$ (block 212). Generator 104 can thereafter compute, via a loss function, a measure of error between $e_{predicted}$ and the desired prediction $e_i$ (block 214), calculate, via back-propagation, an error gradient for neural network 116 based on the computed error (block 216), and update, via a gradient descent method such as stochastic gradient descent, the parameter values of neural network 116 (including process matrix $W_p$ and event matrix $W_e$) using the error gradient (block 218). Through these steps, generator 104 can learn improved values for process matrix $W_p$ and event matrix $W_e$, and thus for the distributed representations of the processes in P and the events in E, that allow those distributed representations to more closely capture the contextual relationships between them.

At block 220, generator 104 can check whether the error computed at block 214 is less than an error threshold (and/or whether a maximum number of training iterations has been reached). If the answer is no, generator 104 can return to block 208 in order to randomly sample another context from P and E and carry out another training iteration on neural network 116.

However, if the answer at block 220 is yes, generator 104 can conclude that neural network 116 is sufficiently trained. Accordingly, generator 104 can output the columns of process matrix $W_p$ and event matrix $W_e$ as the distributed representations of the processes (block 222) and events in P and E respectively and terminate the workflow.

It should be appreciated that workflow 200 is illustrative and various modifications are possible. For example, although the description above assumes that neural network 116 exhibits the particular structure shown in FIG. 3, the same or similar training approach can be implemented using other types of neural networks (e.g., a Transformer model). One of ordinary skill in the art will recognize other variations, modifications, and alternatives.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
receiving, by one or more computer systems, occurrence data including information for a plurality of computing processes and a plurality of events associated with the plurality of computing processes;
training, by the one or more computer systems, a neural network using a self-supervised machine learning (ML) algorithm, the training resulting in generation of:
a set of distributed process representations based on the occurrence data, the set of distributed process representations including, for each computing process in the plurality of processes, a distributed process representation that encodes a sequence of events associated with the computing process in the occurrence data; and
a set of distributed event representations based on the occurrence data, the set of distributed event representations including, for each event in the plurality of events, a distributed event representation that encodes one or more processes associated with the event and one or more events that occur within a window of the event in the occurrence data; and
training, by the one or more computer systems, one or more ML models using the set of distributed process representations and the set of distributed event representations.

2. The method of claim 1 where the training of the neural network comprises:
pre-processing the occurrence data to identify the plurality of processes and the plurality of events.

3. The method of claim 2 wherein the pre-processing comprises:
identifying a set of unique events that appear in the occurrence data;
for each unique event, determining a count indicating a number of times that the unique event appears;
adding, to the plurality of events, one or more events in the set of unique events whose count exceeds a first threshold;
identifying a set of unique processes that appear in the occurrence data;
for each unique process, determining an event count indicating a number of events associated with the unique process in the occurrence data; and
adding, to the plurality of processes, one or more processes in the set of unique processes whose event count exceeds a second threshold.

4. The method of claim 1 wherein the training of the neural network comprises:
creating, for each process in the plurality of processes and for each event in the plurality of events, an identifier corresponding to a one-hot-encoded vector;
randomly sampling, from the plurality of processes and the plurality of events, a context comprising a first process and a set of sequential events executed or incurred by the first process during an event window;
setting the identifiers of the first process and the set of sequential events, minus a particular event in the set, as inputs to the neural network;
propagating the inputs through the neural network, resulting in a predicted event;
computing an error measure between the predicted event and the particular event; and
updating a process matrix and an event matrix of the neural network based on the error measure.

5. The method of claim 4 wherein the training further comprises:
upon determining that the error is less than an error threshold, outputting columns of the process matrix as the set of distributed process representations and columns of the event matrix as the set of distributed event representations.

6. The method of claim 1 wherein the one or more ML models include an ML model configured to predict whether certain computing processes are malware.

7. A non-transitory computer readable storage medium having stored thereon program code executable by one or more computer systems, the program code embodying a method comprising:
receiving occurrence data including information for a plurality of computing processes and a plurality of events associated with the plurality of computing processes;
training a neural network using a self-supervised machine learning algorithm, the training resulting in generation of:
a set of distributed process representations based on the occurrence data, the set of distributed process representations including, for each computing process in the plurality of processes, a distributed process representation that encodes a sequence of events associated with the computing process in the occurrence data; and
a set of distributed event representations based on the occurrence data, the set of distributed event representations including, for each event in the plurality of events, a distributed event representation that encodes one or more processes associated with the event and one or more events that occur within a window of the event in the occurrence data; and
training one or more ML models using the set of distributed process representations and the set of distributed event representations.

8. The non-transitory computer readable storage medium of claim 7 wherein the training of the neural network comprises:
pre-processing the occurrence data to identify the plurality of processes and the plurality of events.

9. The non-transitory computer readable storage medium of claim 8 wherein the pre-processing comprises:
identifying a set of unique events that appear in the occurrence data;
for each unique event, determining a count indicating a number of times that the unique event appears;

adding, to the plurality of events, one or more events in the set of unique events whose count exceeds a first threshold;

identifying a set of unique processes that appear in the occurrence data;

for each unique process, determining an event count indicating a number of events associated with the unique process in the occurrence data; and adding, to the plurality of processes, one or more processes in the set of unique processes whose event count exceeds a second threshold.

10. The non-transitory computer readable storage medium of claim 7 wherein the training of the neural network comprises:

creating, for each process in the plurality of processes and for each event in the plurality of events, an identifier corresponding to a one-hot-encoded vector;

randomly sampling, from the plurality of processes and the plurality of events, a context comprising a first process and a set of sequential events executed or incurred by the first process during an event window;

setting the identifiers of the first process and the set of sequential events, minus a particular event in the set, as inputs to the neural network;

propagating the inputs through the neural network, resulting in a predicted event;

computing an error measure between the predicted event and the particular event; and updating a process matrix and an event matrix of the neural network based on the error measure.

11. The non-transitory computer readable storage medium of claim 10 wherein the training further comprises:

upon determining that the error is less than an error threshold, outputting columns of the process matrix as the set of distributed process representations and columns of the event matrix as the set of distributed event representations.

12. The non-transitory computer readable storage medium of claim 7 wherein the one or more ML models include an ML model configured to predict whether certain computing processes are malware.

13. A computer system comprising:

a processor; and a non-transitory computer readable medium having stored thereon program code that, when executed, causes the processor to:

receive occurrence data including information for a plurality of computing processes and a plurality of events associated with the plurality of computing processes;

train a neural network using a self-supervised machine learning algorithm, the training resulting in generation of:

a set of distributed process representations based on the occurrence data, the set of distributed process representations including, for each computing process in the plurality of processes, a distributed process representation that encodes a sequence of events associated with the computing process in the occurrence data; and a set of distributed event representations based on the occurrence data, the set of distributed event representations including, for each event in the plurality of events, a distributed event representation that encodes one or more processes associated with the event and one or more events that occur within a window of the event in the occurrence data; and train one or more ML models using the set of distributed process representations and the set of distributed event representations.

14. The computer system of claim 13 wherein the training of the neural network comprises:

pre-processing the occurrence data to identify the plurality of processes and the plurality of events.

15. The computer system of claim 14 wherein the pre-processing comprises:

identifying a set of unique events that appear in the occurrence data;

for each unique event, determining a count indicating a number of times that the unique event appears;

adding, to the plurality of events, one or more events in the set of unique events whose count exceeds a first threshold;

identifying a set of unique processes that appear in the occurrence data;

for each unique process, determining an event count indicating a number of events associated with the unique process in the occurrence data; and adding, to the plurality of processes, one or more processes in the set of unique processes whose event count exceeds a second threshold.

16. The computer system of claim 13 wherein the training of the neural network comprises:

creating, for each process in the plurality of processes and for each event in the plurality of events, an identifier corresponding to a one-hot-encoded vector;

randomly sampling, from the plurality of processes and the plurality of events, a context comprising a first process and a set of sequential events executed or incurred by the first process during an event window;

setting the identifiers of the first process and the set of sequential events, minus a particular event in the set, as inputs to the neural network;

propagating the inputs through the neural network, resulting in a predicted event;

computing an error measure between the predicted event and the particular event; and updating a process matrix and an event matrix of the neural network based on the error measure.

17. The computer system of claim 16 wherein the training further comprises:

upon determining that the error is less than an error threshold, outputting columns of the process matrix as the set of distributed process representations and columns of the event matrix as the set of distributed event representations.

18. The computer system of claim 13 wherein the one or more ML models include an ML model configured to predict whether certain computing processes are malware.

* * * * *